No. 773,445. PATENTED OCT. 25, 1904.
W. R. WILLETTS.
WALL, FLOOR, OR CEILING PLATE.
APPLICATION FILED OCT. 17, 1903.
NO MODEL.
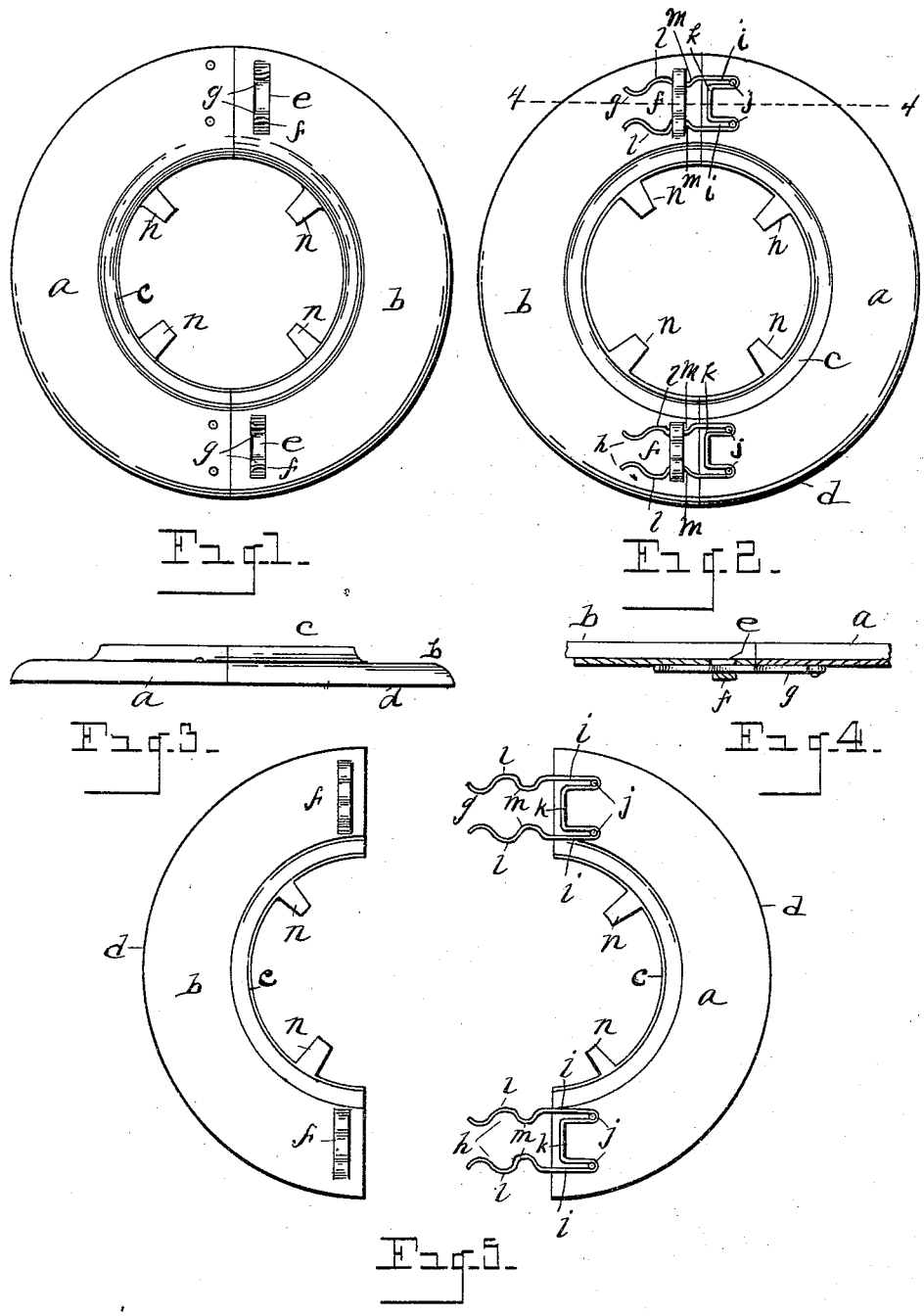
WITNESSES:
INVENTOR.
William R. Willetts
BY
Newell S. Wright.
ATTORNEY.

No. 773,445. Patented October 25, 1904.

UNITED STATES PATENT OFFICE.

WILLIAM R. WILLETTS, OF WATERBURY, CONNECTICUT, ASSIGNOR TO W. A. RUSSELL & CO., OF DETROIT, MICHIGAN, A CORPORATION OF NEW JERSEY.

WALL, FLOOR, OR CEILING PLATE.

SPECIFICATION forming part of Letters Patent No. 773,445, dated October 25, 1904.

Application filed October 17, 1903. Serial No. 177,395. (No model.)

*To all whom it may concern:*

Be it known that I, WILLIAM R. WILLETTS, a citizen of the United States, residing at Waterbury, county of New Haven, State of Connecticut, have invented a certain new and useful Improvement in Wall, Floor, or Ceiling Plates, of which the following is a specification, reference being had to the accompanying drawings, which form a part of this specification.

My invention has for its object certain new and useful improvements in separable wall, floor, or ceiling plates, the same being especially adapted to be applied upon pipes and for analogous uses, my invention consisting of the construction, combination, and arrangement of devices hereinafter described and claimed, and illustrated in the accompanying drawings, in which—

Figure 1 is a plan view. Fig. 2 is an inverted plan view showing the sections connected together. Fig. 3 is a side elevation. Fig. 4 is a view in section on the line 4 4, Fig. 2. Fig. 5 is an inverted plan view showing the sections detached.

In general my invention consists of separable plate-sections adapted to be secured upon a pipe, said sections being provided with suitable devices to firmly connect the sections about the pipe and yet to permit the ready separation and removal of the sections from the pipe whenever it may be desired, my purpose being to so construct the sections and the connecting devices that the sections may be readily and conveniently connected together about a pipe and be locked into position, the construction, however, permitting the ready separation of the sections from the pipe without first having to move the plate from its locked position.

My present invention has more especial reference to an improved construction of the connecting or locking devices for uniting the adjacent ends of the sections of the plates when brought together and to permit the ready release of said connecting or locking devices.

To secure these results, I carry out my invention as follows:

In the drawings, $a\ b$ represent two sections of a wall, floor, or ceiling plate, said sections each preferably constituting one-half of the completed plate, the sections being cut away on their inner adjacent edges on the arc of a circle to form when the sections are brought together an inner opening through which a corresponding pipe may be passed. The two sections of the plate form when brought together an annular plate, the sections being stamped of any desired form, preferably so as to form a shoulder $c$ to extend about a pipe, the periphery of the sections being formed, as indicated at $d$, to fit against an adjacent wall or ceiling. One of the said sections—as, for example, the section $b$—is provided with elongated openings, as at $e$, on the outer surface thereof, said section provided on its inner face with loops, (indicated at $f$.) The openings $e$ and the loops $f$ may conveniently be formed by kerfing the plate at the sides of the loop and forming the metal of the plate between the kerfs into the loop $f$. This is done at the ends of one of the sections, as shown. Upon the adjacent section of the plate are engaged spring-arms $g\ h$, the spring-arms $g\ h$ at the opposite extremities of the adjacent section of the plate being duplicates the one of the other, each set of arms being formed of an integral piece of spring-wire bent to form the arms $g$ or $h$, the wire of which said arms are formed being bent intermediate its ends to form loops $i\ i$, said loops being engaged upon pins $j$. The intermediate portion $k$ of the spring-wire strip, together with the parts forming the respective loops $i\ i$, bear firmly against the adjacent section of the plate, and when secured upon the pins $j$ the spring-arms are held firmly in position, the arms $g$ and $h$ projecting beyond the edges of the adjacent section of the plate and have a yielding movement and spring tension, the arms $g$ and $h$ being so shaped that their projecting ends will readily, when pressed together, enter the corresponding loops $f\ f$. The arms $g$ and $h$ are preferably bent away the one from the other toward their extremities, as at $l$. Adjacent to the extensions $l$ the arms are preferably bent inward again the one toward the other, as indicated at *m*, thereby forming recesses to engage the extremities of the corresponding loops *f* when the plates are in connected position.

It will readily be perceived that when the extremities of the arms *g* and *h* are entered in the loops *f f* and the two sections are forced the one toward the other the extremities of the loops coming into contact with portions *l* of the arms will spring the arms together, permitting the extensions *l* to pass through the loop, after which the arms by their spring tension will separate or spread apart to engage the recesses *m* with the extremities of the loop to hold the two sections firmly together and prevent their inadvertent displacement or disconnection the one from the other.

It has been found of great advantage to have the connecting arms or devices engaged with one of the sections of the plate formed with the yielding arms, since by pressing the two adjacent arms toward each other the two sections of the plate may very readily be separated. It will be evident by reference to Fig. 1 that the two adjacent spring-arms are readily accessible from the exterior of the plate, inasmuch as they pass under the corresponding loop *f*, and as the two arms are movable by a suitable implement a workman may engage the two spring-arms from the exterior of the plate and spring them together, permitting the sections of the plate to be readily separated and removed from the pipe without first having to displace the plate from its applied position upon the pipe and against the wall or ceiling. The two sections are also preferably provided with a series of spring-arms *n* to engage the pipe, the extremities of which are arranged to bear against the pipe in a well-known manner.

The operation of the device will be readily understood. The extremities of the spring-arms *g* and *h* are normally so arranged as to enter the corresponding loops of the opposite section of the plate without having to be forced together by the workman, the arms yielding toward each other as the sections are forced together, and when the meeting edges of the sections are brought together the spring-arms will yield outwardly to engage the recesses *m* with the extremities of the loops *f*.

What I claim as my invention is—

1. A plate formed of two separable sections, one of said sections constructed with loops projecting from the inner face thereof, the other section provided with spring-arms engaged with the inner face and projecting beyond the extremities thereof to enter said loops, each spring-arm being formed of a single integral piece of wire, and bent to form oppositely-projecting shoulders to engage the extremities of the corresponding loops.

2. A plate formed of two separable sections, one of said sections toward the extremities thereof constructed with loops projecting from the inner face thereof and struck up therefrom, the other section toward the extremities thereof provided with spring-arms engaged therewith and arranged to enter said loops, each spring-arm being formed of a single piece of spring-wire bent intermediate its extremities to form attaching-loops, and means to engage said loops with the adjacent inner face of the section.

In testimony whereof I have signed this specification in the presence of two subscribing witnesses.

WILLIAM R. WILLETTS.

Witnesses:
 GEO. E. TERRELL,
 FRED S. MEACHAM.